United States Patent [19]
Cooper et al.

[11] Patent Number: 5,815,732
[45] Date of Patent: Sep. 29, 1998

[54] SYSTEM FOR SERVICE ACTIVATION PROGRAMMING OF WIRELESS NETWORK ACCESS DEVICES USING AN EXTERNAL MODULE

[75] Inventors: Gershon N. Cooper, Encino; Asher Avitan, Granada Hills, both of Calif.

[73] Assignee: ORA Electronics, Inc., Chatsworth, Calif.

[21] Appl. No.: 603,465

[22] Filed: Feb. 20, 1996

[51] Int. Cl.⁶ .............................. G06F 13/14; H04Q 7/32; H04Q 7/34

[52] U.S. Cl. .............................. 395/856; 379/58; 379/59; 379/91.01; 455/418; 455/419; 455/507; 455/186.2

[58] Field of Search .......................... 379/58, 59, 91.01; 455/418, 38.2, 419, 551, 186.1, 186.2, 507; 395/856

[56] References Cited

U.S. PATENT DOCUMENTS 5,485,634  1/1996  Weiser et al. ........................... 455/53.1
5,619,562  4/1997  Maurer et al. ........................... 379/201

*Primary Examiner*—Thomas C. Lee
*Assistant Examiner*—Rehana Perveen
*Attorney, Agent, or Firm*—Matthew F. Jodziewicz

[57] ABSTRACT

A system and method for programming a wireless network access device which has both a keypad for manually entering data and commands to the device, and a device Input/Output data interface bus port for communicating data and command signals between an external source and the device databus including a module having a processor that contains and operates in accord with a control program. The processor further has in memory, prestored data and command signals necessary for programming the device. A cable, or connector couples the module to the device Input/Output data interface bus port for transferring information between the module processor and the device databus. The processor control program transfers data and command signals stored in the module's memory to the device databus for at least partially programming the device.

47 Claims, 2 Drawing Sheets

SYSTEM FOR SERVICE ACTIVATION PROGRAMMING OF WIRELESS NETWORK ACCESS DEVICES USING AN EXTERNAL MODULE

REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to wireless network access devices and systems for programming such devices, and, more particularly, to a system and method for the programming of cellular telephones by using an external module capable of at least partially programming the cellular telephone, and which is useful for the activation control of cellular telephones by being used in conjunction with activation data received from the wireless system administrators that is normally entered manually on the cellular telephone's keypad by a user.

2. Known Prior Art

Wireless network access devices, such as cellular telephones, permit user programming of certain functions such as stored telephone numbers for later recall, selecting device operational characteristics, and almost all require a skilled person to program certain information into the unit prior to its activation on a wireless system.

The user normally attempts to program these functions into the device using the keyboard or touch pad found on these devices. Other methods include interfacing the device with an external programming processor connected through the Input/Output data interface bus port found almost universally in these devices as taught in U.S. Pat. No. 5,386,455.

The problem with the former method is that it is prone to user errors made while using the keyboard or touch pad. The likelihood of manual user errors made in data entry are compounded when a large number keystrokes must be made, for example, in entering telephone numbers into the device's memory for later recall or in activation programming of a cellular telephone. Some devices support nearly 100 stored telephone numbers, so the probability of manual error is fairly high. Also, the programming process is both complex and time consuming in that it requires specific keystrokes that are usually unique to each model and make of cellular telephone.

The problem with the later method is that external programming systems are complex in operation and, being costly are not available to the average consumer.

Another problem area is the distribution control of wireless network access devices, such as cellular telephones, by service carriers willing to give a potential customer a free or subsidized unit with the proviso that the recipient of the unit activate the unit with the subsidizing carrier.

Many recipients of such cellular telephones either do not understand the conditions for receiving such subsidized cellular telephones, or simply do not have the intention of activating the cellular telephone with the specific carrier. However, once the cellular telephone is in the hands of the individual, it is difficult, if not impossible, to control the activation of the cellular telephone so as to limit its use to the carrier sponsoring the subsidy for the unit.

No known system or method has been found that successfully solves the problems caused by the complexity of programming a wireless network access device or the activation distribution problem faced by the carriers.

The present invention provides a solution to these problems in a manner that is simple, inexpensive and accurate, as well as providing a system and a method capable of permitting wider distribution of cellular devices so that they may be activated in areas having no direct landline telephone lines, and that is less prone to error than existing systems and methods.

The present invention is embodied in a system and a method useful for programming a wireless network access device which has both a keypad for manually entering data and commands to the device, and a device Input/Output data interface bus port for communicating data or command signals between an external source and the device databus.

A system embodying the present invention includes a module having a processor that contains and operates in accord with a control program. The processor further has in memory, prestored data and command signals necessary for programming the device.

A cable, direct connector, RF or IR link, couples the module to the device Input/Output data interface bus port for transferring information between the module processor and the device databus.

The processor control program transfers data and command signals stored in the module's memory to the device databus for at least partially programming the device.

A method that embodies the present invention for use in activation programming of a wireless network access device includes the steps of:

connecting to the Input/Output data interface bus port of the wireless network access device a module having a processor that contains and operates in accord with a control program. The processor further having in a memory, prestored data and command signals necessary for activation programming of the device to at least partially program the device on a wireless network system.

Additional steps in the method may include:

entering manually on the device keypad an activating identification data received from an authorized wireless network system activating source.

Furthermore, steps providing for the following are also within the scope of the method:

removing the module from the device Input/Output data interface bus port after the programming of the device is complete.

Finally, steps such as the following are also included in the method of the present invention:

enabling the keyboard programming mode of the wireless network access device whenever the module is connected to the device Input/Output data interface bus port; and, disabling the keyboard programming mode of the device whenever the module is connected to the device Input/Output data interface bus port to prevent further manual input of data or command signals to the device.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

A preferred embodiment of the present invention will now be described with reference to the Figures.

Figure 1:
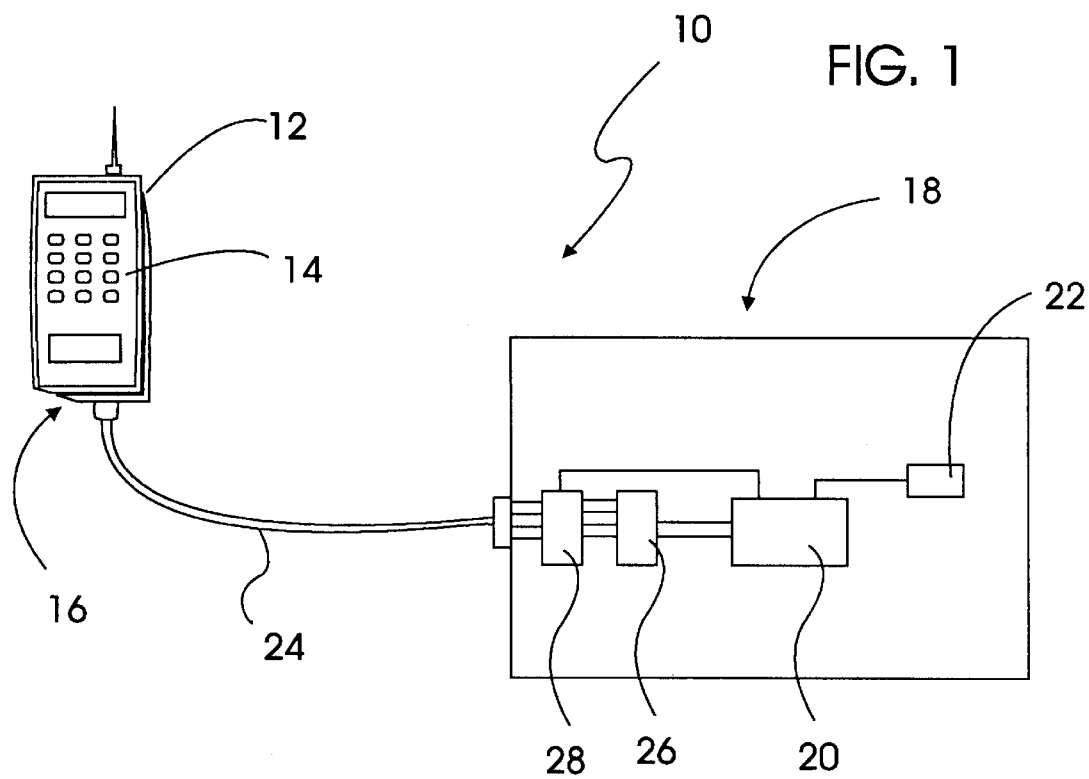
FIG. 1 is a block diagram of a system embodying the present invention showing the operating component blocks of such a system.

FIG. 1 illustrates, in idealized block component form, a system 10 embodying the present invention for programming a wireless network access device, such as a cellular telephone unit 12. Wireless network access devices almost universally have a keypad 14 for manually entering data and commands to the device, and a device Input/Output data interface bus port 16 for communicating data and command signals between an external source and the device's internal databus.

System 10 includes a module 18 having processor 20 containing and operating in accord with a control program. Processor 20 may be any programmable device such as any of the various families of processors such as the Z80, 8080, 8086 or 80×86 or higher classes. Processor 20 has in memory 22, prestored data and command signals necessary for programming cellular telephone 12. Memory 22 may be either internal to processor 20, or an external ROM or RAM device.

Cable 24 connects module 18 to Input/Output data interface bus port 16 on cellular telephone 12 to enable processor 20 to transfer information between itself and cellular telephone databus. Also usable for this communications link is to provide a connector adapted to directly mate with the Input/Output data interface bus port of the cellular telephone, or to use an RF or IR communications link to connect the module with the wireless network access device.

The processor control program transfers data and command signals from module memory 22 to the cellular telephone databus for programming the cellular telephone.

While this described system embodies the present invention, additional preferred elements may be added that also constitute embodying the present invention as described below.

Figure 2:
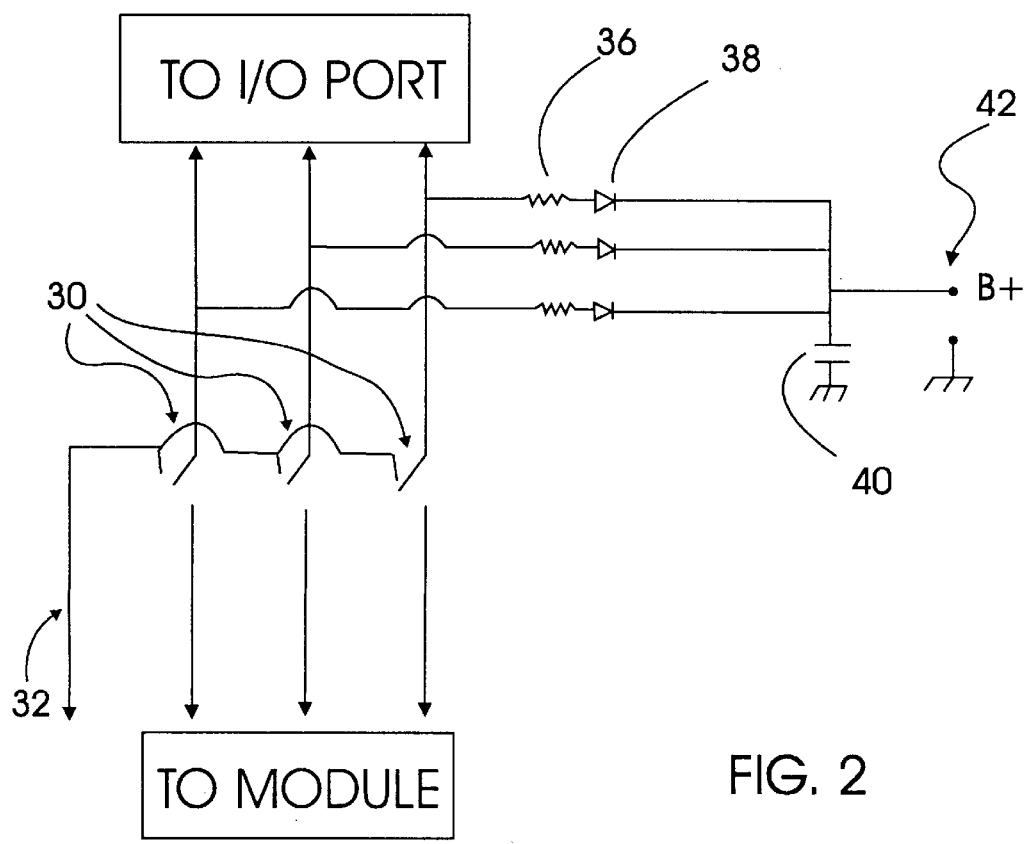
FIG. 2 is a schematic illustrating a portion of a system embodying the present invention that shows preferred power and safety switching circuitry of such a system; and, FIG. 3 is a schematic circuit illustrating a portion of a system embodying the present invention that shows a preferred voltage integrating circuit.

Module 18 may include circuitry 26, shown in FIG. 1 and in greater detail in FIG. 2, for delaying the programming operation of the processor control program or the operational connection of processor 20 for a preselected time period. The preselected time period may be an absolute time span, as measured from detection of signals on the cellular telephone databus through the Input/Output data interface bus port, or merely be a predetermined delay measured from the connection of module 18 to the cellular telephone Input/Output data interface bus port 16.

Circuitry 26 may operate by sensing the operational status of cellular telephone 12 and generating a signal useful for controlling the operation of the processor control program.

For example, circuitry 26 may prevent the start of the operation of the processor control program until preselected operational status conditions are detected, such as signal activity or the lack thereof, on the cellular telephone databus through the cellular telephone Input/Output data interface bus port 16.

Likewise, circuitry 26 may sense for signals on cellular telephone databus that are representative of keypad activity.

Circuitry 26 may be as shown in FIG. 2 to be a series of control switches 30, manual or automatically controlled by a control line 32 carrying a control signal from processor 20 that engage and disengage module 18 from connection with the Input/Output data interface bus port 16.

Module 18 may also include circuitry or software commands that enables the programming mode of cellular telephone 12 for manually entering data and commands to the cellular telephone 12 whenever module 18 is connected to the cellular telephone Input/Output data interface bus port 16, and disables the programming mode for manually entering data and commands to cellular telephone 12 whenever module 18 is disconnected from cellular telephone Input/Output data interface bus port 16.

Module 18 also preferably contains a battery, or circuitry 28, shown in FIG. 1 and in greater detail as 34 in FIG. 2, for drawing power for operation of module 18 from the cellular telephone 12 preferably from signals present on Input/Output data interface bus port 16.

As shown in FIG. 2, circuitry 34 preferably consists of a series resistor and diode 38 combination on at least one, and, preferably, on each, of the signal lines from Input/Output data interface bus port 16 that each feeding a common capacitor 40 which, when charged, provides a source of power 42 for the operation of the various components of module 18, such as processor 20 and, if required, memory 22. Since there is almost always at least one signal, usually in the 5 volt range, present on at least one of the data/signal lines from the cellular telephone 12, capacitor 40 will be quickly charged and provide a storehouse for power if all three data/signal lines were to go momentarily quiescent.

An alternate embodiment of the present invention includes having a circuit as that integrates the voltage being stored in capacitor from the electrical signals on the plurality of pins.

Figure 3:
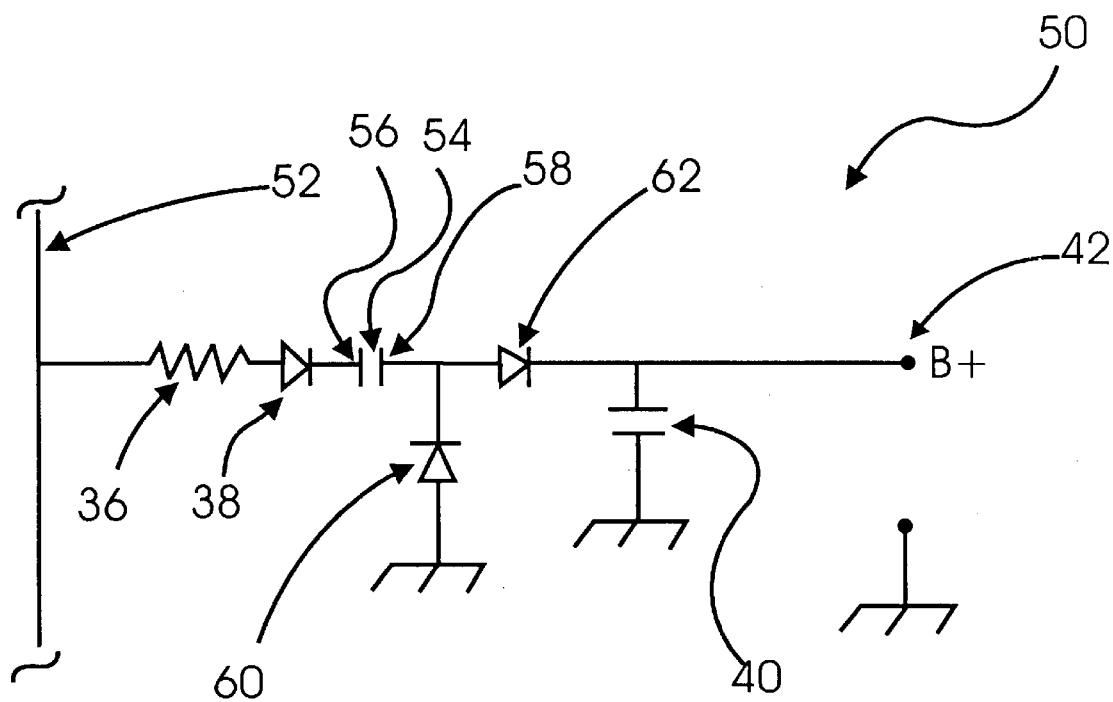

One such circuit 50 is shown in FIG. 3 for one of the Input/Output data interface bus port pin lines 52, but similar circuitry may be added to other lines. Circuit 50 is a voltage doubler circuit and includes following the series resistor and diode combination discussed above, a capacitor 54 connected on a first side 56 to diode 38 and on a second side 58 as a center tap to first and second doubling diodes 60, 62 respectively. First and second doubling diodes 60, 62 are connected in series having the same direction of current flow. First doubling diode 60 is connected on an end opposite to the center tap to ground, and second doubling diode 62 is connected on an end opposite the center tap to capacitor 40 as described above previously.

The present invention is also found in a method for activation programming of a wireless network access device, such as a cellular telephone, on a wireless network system. The device to be activated has a keypad for manually entering data and commands into the device, and a device Input/Output data interface bus port for communicating data and command signals between an external source and the device databus.

The preferred method embodying the present invention includes the steps of:

connecting to the device Input/Output data interface bus port a module having a processor that contains and operates in accord with a control program. The processor further has in memory, prestored data and command signals necessary to at least partially complete the activation programming of the device on a wireless network system.

To provide even greater control over the activation programming of the device, the method preferably includes additional steps such as the following:

entering manually on the device keypad an activating identification data received from an authorized wireless network system activating source.

Also, removing the module from the device Input/Output data interface bus port after the programming of the device is complete, and enabling the programming mode of the wireless network access device whenever said module is connected to the device Input/Output data interface bus port; and, disabling the programming mode of the device whenever the module is disconnected from the device Input/Output data interface bus port to prevent further manual input of data or command signals to the device.

Also, for protection purposes, it is preferred that the following step be added to the preferred method:

delaying, after connecting the module to the device Input/Output data interface bus port, the programming operation of said control program for a preselected time period.

Appropriate methods of accomplishing this last step would include:

sensing the operational status of the device and preventing the start of the programming operation of the processor control program until preselected operational status conditions are detected, such as, sensing signal activity or the lack thereof, on the device databus through the device Input/Output data interface bus port.

For even greater security and control over the activation process, the preferred method includes steps such as the following:

enabling the programming mode of the device for manually entering data and commands to the device whenever the module is connected to the device Input/Output data interface bus port; and, disabling the programming mode of the device for manually entering data and commands to the device whenever the module is disconnected from the device Input/Output data interface bus port.

An alternate preferred method embodying the present invention includes provisions for obtaining power for the module by providing a battery, or by providing circuitry designed to draw power from the signals on the Input/Output data interface bus port.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A system for service activation programming of a wireless network access device, the device having a keypad for manually entering data and commands to the device, and a device Input/Output data interface bus port for communicating data and command signals between an external source and the device databus, said system comprising:

module having processing means containing and operating in accord with a control program, said processing means further having in memory means, prestored data necessary for service activation programming of the wireless network access device to at least partially program the device for service activation;

means, detachably connecting said external module to the wireless network access device, for transferring information therebetween, said control program transferring data from said external module to the device for service activation programming of the device; and, means for delaying the programming operation of said control program for a preselected time period.

2. A system as in claim 1 wherein said means connecting said external module to the wireless network access device comprises:

means detachably connecting said external module to the Input/Output data interface bus port of the device.

3. A system as in claim 1 wherein said preselected time period commences with the connection of said module to the device.

4. A system for service activation programming of a wireless network access device, the device having a keypad for manually entering data and commands to the device, and a device Input/Output data interface bus port for communicating data and command signals between an external source and the device databus, said system comprising:

module having processing means containing and operating in accord with a control programs said processing means further having in memory means, prestored data necessary for service activation programming of the wireless network access device to at least partially program the device for service activation;

means, detachably connecting said external module to the wireless network access device, for transferring information therebetween, said control program transferring data from said external module to the device for service activation programming of the device; and, means for sensing the operational status of the wireless network access device and generating a signal useful for controlling the programming operation of said control program.

5. A system as in claim 4 wherein said sensing means prevents the start of the programming operation of said control program until preselected operational status conditions are sensed.

6. A system as in claim 4 wherein said sensing means detects the signal activity on the device databus through the device Input/Output data interface bus port.

7. A system as in claim 6 wherein said sensing means prevents the start of the programming operation of said control program if no signal activity is detected on the device databus through the device Input/Output data interface bus port.

8. A system as in claim 1 further comprising:

means for sensing signals on the device databus that are representative of keypad activity.

9. A system for service activation programming of a wireless network access device the device having a keypad for manually entering data and commands to the device, and a device Input/Output data interface bus port for communicating data and command signals between an external source and the device databus, said system comprising:

a module having processing means containing and operating in accord with a control program, said processing means further having in memory means, prestored data necessary for service activation programming of the wireless network access device to at least partially program the device for service activation;

means, detachably connecting said external module to the wireless network access device, for transferring information therebetween, said control program transferring data from said external module to the device for service activation programming of the device; and, means for enabling and disabling the programming mode of the wireless network access device.

10. A system as in claim 9 wherein said enabling/disabling means enables the keyboard programming mode of the device for manually entering data to the device whenever said external module is connected to the device Input/Output data interface bus port, and disables the keyboard programming mode for manually entering data to the device whenever said external module is disconnected from the device Input/Output data interface bus port.

11. A system for service activation programming of a wireless network access device the device having a keypad for manually entering data and commands to the device, and a device Input/Output data interface bus port for communicating data and command signals between an external source and the device databus, said system comprising:

a module having processing means containing and operating in accord with a control program said processing means further having in memory means, prestored data necessary for service activation programming of the wireless network access device to at least partially program the device for service activation;

means detachably connecting said external module to the wireless network access device, for transferring information therebetween, said control program transferring data from said external module to the device for service activation programming of the device; and, means for drawing power for operation of said external module from the wireless network access device.

12. A system as in claim 11 wherein said means for drawing power draws power through the device Input/Output data interface bus port.

13. A system as in claim 12 wherein said means for drawing power comprises:

means for drawing power from the signals present on the device Input/Output data interface bus port.

14. A system as in claim 1 further comprising:

a power source for operation of said external module.

15. A system as in claim 14 wherein said power source includes a battery.

16. A system for programming a wireless network access device which has a keypad for manually entering dataand commands to the device, and a device Input/Output data interface bus port for communicating data and command signals between an external source and the device databus, said system comprising:

A module, external and detachable from the device databus, having processing means containing and operating in accord with a control program, said processing means further having in memory means, prestored data and command signals necessary for programming the device:

Means, detachably connecting said external module to the device, for transferring information between said module and the device;

Said control program transferring data and command signals from said external module memory means to the device databus for programming of the device; and, means for delaying the programming operation of said control program for a preselected time period.

17. A system as in claim 16 wherein said means connecting said module to the wireless network access device comprises:

means detachably connecting said external module to the Input/Output data interface bus port of the device.

18. A system as in claim 16 wherein said preselected time period commences with the connection of said external module to the device.

19. A system for programming a wireless network access device which has a keypad for manually entering dataand commands to the device, and a device Input/Output data interface bus port for communicating data and command signals between an external source and the device databus, said system comprising:

A module, external and detachable from the device databus, having processing means containing and operating in accord with a control program, said processing means further having in memory means, prestored data and command signals necessary for programming the device, Means, detachably connecting said external module to the device, for transferring information between said module and the device;

Said control program transferring data and command signals from said external module memory means to the device databus for programming of the device; and, means for sensing the operational status of the wireless network access device and generating a signal useful for controlling the operation of said control program.

20. A system as in claim 19 wherein said sensing means prevents the start of the operation of said control program until preselected operational status conditions are detected.

21. A system as in claim 19 wherein said sensing means detects the signal activity on the device databus through the device Input/Output data interface bus port.

22. A system as in claim 21 wherein said sensing means prevents the start of the operation of said control program if no signal activity is sensed on the device databus through the device Input/Output data interface bus port.

23. A system as in claim 17 further comprising:

means for sensing signals on the wireless network access device databus representative of keypad activity.

24. A system for programming a wireless network access device which has a keypad for manually entering dataand commands to the device, and a device Input/Output data interface bus port for communicating data and command signals between an external source and the device databus, said system comprising:

A module, external and detachable from the device databus, having processing means containing and operating in accord with a control program, said processing means further having in memory means, prestored data and command signals necessary for programming the device;

Means, detachably connecting said external module to the device, for transferring information between said module and the device;

Said control program transferring data and command signals from said external module memory means to the device databus for programming of the device; and, means for enabling and disabling the programming mode of the wireless network access device.

25. A system as in claim 24 wherein said enabling/disabling means enables the keyboard programming mode of the device for manually entering data to the device whenever said external module is connected to the device Input/Output data interface bus port, and disables the keyboard programming mode for manually entering data to the device whenever said external module is disconnected from the device Input/Output data interface bus port.

26. A system for programming a wireless network access device which has a keypad for manually entering data and commands to the device, and a device Input/Output data interface bus port for communicating data and command signals between an external source and the device databus, said system comprising:

A module, external and detachable from the device databus, having processing means containing and operating in accord with a control program, said processing means further having in memory means, prestored data and command signals necessary for programming the device;

Means, detachably connecting said external module to the device, for transferring information between said module and the device;

Said control program transferring data and command signals from said external module memory means to the device databus for programming of the device; and, means for drawing power for operation of said external module from the wireless network access device.

27. A system as in claim 26 wherein said means for drawing power draws power through the device Input/Output data interface bus port.

28. A system as in claim 27 wherein said means for drawing power includes means for drawing power from signals present on the device Input/Output data interface bus port.

29. A system as in claim 17 further comprising:

a power source for operation of said external module.

30. A system as in claim 29 wherein said power source includes a battery.

31. A method for activation programming of a wireless network access device on a wireless network system, the device having a keypad for manually entering data and commands to the device, and a device Input/Output data interface bus port for communicating data and command signals between an external source and the device databus comprising the steps of:

connecting to the device a module, external and detachable from the device databus, having processing means containing and operating in accord with a control program, said processing means further having in memory means, prestored data and command signals necessary for activation programming of the device to at least partially program the device on a wireless network system;

enabling the keyboard programming mode of the wireless network access device whenever said external module is connected to the device; and, disabling the keyboard programming mode of the device whenever said external module is disconnected from the device to prevent further manual input of data or command signals to the device.

32. A method as in claim 31 further comprising the step of:

detachably connecting said external module to the device Input/Output data interface bus port.

33. A method as in claim 31 further comprising the step of:

entering manually on the device keypad an activating identification code received from an authorized wireless network system activating source.

34. A method as in claim 31 further comprising the step of:

removing the module from the device Input/Output data interface bus port after the programming of the device is complete.

35. A method for activation programming of a wireless network access device on a wireless network system, the device having a keypad for manually entering data and commands to the device, and a device Input/Output data interface bus port for communicating data and command signals between an external source and the device databus, comprising the steps of:

connecting to the device a module, external and detachable from the device databus, having processing means containing and operating in accord with a control program, said processing means further having in memory means, prestored data and command signals necessary for activation programming of the device to at least partially program the device on a wireless network system; and, delaying, after connecting the external module to the device, the programming operation of said control program for a preselected time period.

36. A method for activation programming of a wireless network access device on a wireless network system, the device having a keypad for manually entering data and commands to the device, and a device Input/Output data interface bus port for communicating data and command signals between an external source and the device databus comprising the steps of:

connecting to the device a module, external and detachable from the device databus, having processing means containing and operating in accord with a control program, said processing means further having in memory means, prestored data and command signals necessary for activation programming of the device to at least partially program the device on a wireless network system; and sensing the operational status of the device and preventing the start of the programming operation of said control program until preselected operational status conditions are detected.

37. A method as in claim 36 wherein the step of sensing the operational status of the device further comprises:

sensing signal activity on the device databus through the device Input/Output data interface bus port.

38. A method as in claim 37 wherein said step of sensing the signal activity on the device databus further comprises:

preventing the start of the programming operation of said control program if no signal activity is sensed on the device databus.

39. A method for activation programming of a wireless network access device on a wireless network system, the device having a keypad for manually entering data and commands to the device, and a device Input/Output data interface bus port for communicating data and command signals between an external source and the device databus comprising the steps of:

connecting to the device a module, external and detachable from the device databus having processing means containing and operating in accord with a control program, said processing means further having in memory means, prestored data and command signals necessary for activation programming of the device to at least partially program the device on a wireless network system, enabling the keyboard programming mode of the device for manually entering data to the device whenever said external module is connected to the device; and, disabling the keyboard programming mode of the device for manually entering data to the device whenever said external module is disconnected from the device.

40. A method for activation programming of a wireless network access device on a wireless network system, the device having a keypad for manually entering data and commands to the device, and a device Input/Output data interface bus port for communicating data and command signals between an external source and the device databus, comprising the steps of:

connecting to the device a module, external and detachable from the device databus having processing means containing and operating in accord with a control program, said processing means further having in memory means, prestored data and command signals necessary for activation programming of the device to at least partially program the device on a wireless network system; and, providing a source of power to said external module by drawing power for operation of said external module from the wireless network access device.

41. A method as in claim 40 wherein said step of drawing power from the device further comprises the step of:

drawing power from the device through the device Input/Output data interface bus port.

42. A method as in claim 40 wherein said step of drawing power from the device further comprises the step of:

drawing power from the signals on the Input/Output data interface bus port.

43. A circuit for providing a source of electrical power from a wireless network access device having a device Input/Output data interface bus port for communicating over a plurality of pins, electrical signals between an external source and the device, said circuit comprising:

resistor means and diode means in series, connected to at least one pin of the plurality of pins, said diode means further connected to capacitor means for charging said capacitor means from electrical signals on said at least one pin passing through said resistor means and said diode means; and, power output means connected to said capacitor means for providing a source of power from energy stored in said capacitor means.

44. A circuit as in claim 43 further comprising:

having, on at least two of said plurality of pins, resistor means and diode means in series, each of said diode means being connected in common to said capacitor means for charging said capacitor means from electrical signals on the plurality of pins.

45. A circuit as in claim 44 further comprising:

means for integrating the voltage being stored in said capacitor means from the electrical signals on the plurality of pins.

46. A circuit as in claim 45 wherein said voltage integrating means comprises:

a voltage doubler circuit.

47. A circuit as in claim 46 wherein said voltage doubler circuit comprises:

doubling capacitor means connected on a first side to said diode means and on a second side as a center tap to first and second doubling diode means, said first and second doubling diode means connected in series having the same direction of current flow, said first doubling diode means being connected on an end opposite to said center tap to ground, and said second doubling diode means being connected on an end opposite said center tap to said capacitor means.

* * * * *